(12) United States Patent
Kahn et al.

(10) Patent No.: US 8,553,554 B2
(45) Date of Patent: Oct. 8, 2013

(54) METHOD AND APPARATUS FOR PROVIDING CONGESTION CONTROL IN RADIO ACCESS NETWORKS

(75) Inventors: Colin Kahn, Morris Plains, NJ (US); Philip Lamoureux, Succasunna, NJ (US); Mahmoud R. Sherif, Landing, NJ (US); Sherif R. Sherif, Landing, NJ (US); Ahmed A. Tarraf, Bayonne, NJ (US); Xin Wang, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 68 days.

(21) Appl. No.: 12/122,356

(22) Filed: May 16, 2008

(65) Prior Publication Data

US 2009/0285099 A1     Nov. 19, 2009

(51) Int. Cl.
*G01R 31/08* (2006.01)

(52) U.S. Cl.
USPC .......................................................... 370/236

(58) Field of Classification Search
USPC .......................................................... 710/52
See application file for complete search history.

(56) References Cited

U.S. PATENT DOCUMENTS

| | | | |
|---|---|---|---|
| 6,538,989 B1 | 3/2003 | Carter et al. | |
| 6,631,122 B1 | 10/2003 | Arunachalam et al. | |
| 6,788,646 B1 | 9/2004 | Fodor et al. | |
| 7,760,646 B2 * | 7/2010 | Kekki ............................. | 370/236 |
| 2003/0039246 A1 | 2/2003 | Guo et al. | |
| 2003/0235171 A1 | 12/2003 | Lundstrom et al. | |
| 2004/0141462 A1 | 7/2004 | Mistry et al. | |
| 2004/0148425 A1 | 7/2004 | Haumont et al. | |
| 2005/0002335 A1 | 1/2005 | Adamczyk et al. | |
| 2005/0094618 A1 | 5/2005 | Colban et al. | |
| 2005/0111462 A1 | 5/2005 | Walton et al. | |
| 2005/0237969 A1 | 10/2005 | Jung et al. | |
| 2005/0249114 A1 | 11/2005 | Mangin et al. | |

(Continued)

FOREIGN PATENT DOCUMENTS

| | | |
|---|---|---|
| DE | 10 2005 035 237 A1 | 3/2007 |
| EP | 1 304 831 A2 | 4/2003 |
| JP | 2001-320410 A | 11/2001 |

OTHER PUBLICATIONS

K. Ramakrishnan et al., "The Addition of Explicit Congestion Notification (ECN) to IP" RFC 3168, Standards Track, Sep. 2001, http://www.ietf.org/rfc/rfc3168.txt.

(Continued)

*Primary Examiner* — Chi Pham
*Assistant Examiner* — Kouroush Mohebbi
(74) *Attorney, Agent, or Firm* — Wall & Tong, LLP

(57) ABSTRACT

The invention includes a method and apparatus adapted for controlling congestion in a Radio Access Network (RAN). In one embodiment, a method includes monitoring packets received at a first network element of the RAN for an indication of congestion, where the packets are associated with a quality-of-service class, and, in response to detecting an indication of congestion in at least one of the received packets, signaling congestion status information from the first network element of the RAN toward a second network element of the RAN that is adapted for applying congestion control for the quality-of-service class. In one embodiment, a method includes receiving, at a first network element of the RAN, from a second network element of the RAN, congestion status signaling indicative of a congestion condition associated with a quality-of-service class, and applying congestion control for the quality-of-service class in response to receiving the congestion status signaling indicative of the congestion condition.

23 Claims, 4 Drawing Sheets

(56) References Cited

U.S. PATENT DOCUMENTS

| | | | |
|---|---|---|---|
| 2005/0265363 A1 | 12/2005 | Chen | |
| 2006/0007862 A1* | 1/2006 | Sayeedi et al. | 370/235 |
| 2006/0098645 A1 | 5/2006 | Walkin | |
| 2006/0126509 A1* | 6/2006 | Abi-Nassif et al. | 370/235 |
| 2006/0182065 A1* | 8/2006 | Petrovic et al. | 370/332 |
| 2006/0239188 A1 | 10/2006 | Weiss et al. | |
| 2006/0268689 A1* | 11/2006 | Tarraf et al. | 370/229 |
| 2006/0268908 A1 | 11/2006 | Wang et al. | |
| 2007/0153695 A1* | 7/2007 | Gholmieh et al. | 370/235 |
| 2007/0195788 A1 | 8/2007 | Vasamsetti et al. | |
| 2007/0207818 A1 | 9/2007 | Rosenberg et al. | |
| 2008/0005572 A1 | 1/2008 | Moskowitz | |
| 2008/0089237 A1 | 4/2008 | Molen et al. | |
| 2008/0137536 A1 | 6/2008 | Hede | |
| 2008/0192711 A1 | 8/2008 | Balachandran et al. | |
| 2009/0083144 A1 | 3/2009 | Menditto et al. | |
| 2009/0225655 A1 | 9/2009 | Ray et al. | |
| 2009/0252148 A1 | 10/2009 | Dolganow et al. | |
| 2009/0296613 A1 | 12/2009 | Kahn et al. | |
| 2009/0300153 A1 | 12/2009 | Ray et al. | |
| 2010/0080123 A1 | 4/2010 | Kahn et al. | |
| 2010/0080153 A1 | 4/2010 | Kahn et al. | |

OTHER PUBLICATIONS

F. Chang and J. Ren, "Validating System Properties Exhibited in Execution Traces," ASE'07, Nov. 4-9, 2007, Atlanta, Georgia.

International Search Report and The Written Opinion of the International Searching Authority, Or the Declaration, in PCT/US2009/003269, Alcatel-Lucent USA Inc., Applicant, dated Nov. 2, 2009, 12 pages.

Office Action in EP Application No. 09 758 703.4-1249, Alcatel-Lucent USA Inc., Applicant, mailed Oct. 13, 2011, 7 pages.

R. Gibbens, P. Key, "Distributed Control and Resource Marking Using Best-Effort Routers," IEEE Network, IEEE Service Center, New York, NY, US, vol. 15, No. 3, May 1, 2001, pp. 54-59.

Jul. 24, 2012 Office Action in JP 2011-512458, Alcatel-Lucent USA Inc., Applicant, 3 pages.

\* cited by examiner

100

200

300

US 8,553,554 B2

METHOD AND APPARATUS FOR PROVIDING CONGESTION CONTROL IN RADIO ACCESS NETWORKS

FIELD OF THE INVENTION

The invention relates to the field of communication networks and, more specifically, to management of quality of service in Radio Access Networks (RANs).

BACKGROUND OF THE INVENTION

In existing Radio Access Networks (RANs), such as Evolution Data—Optimized (EV-DO) networks, congestion is controlled using admission control, which involves decisions as to whether or not to allow new packet flows into the RAN while the RAN is congested. Disadvantageously, however, use of admission control to alleviate congestion is a slow process because only when new packet flows are established is there an opportunity to reduce congestion in the RAN.

SUMMARY OF THE INVENTION

Various deficiencies in the prior art are addressed through a method and apparatus for controlling congestion in a Radio Access Network (RAN).

In one embodiment, a method includes monitoring packets received at a first network element of the RAN for an indication of congestion, where the packets are associated with a quality-of-service class, and, in response to detecting an indication of congestion in at least one of the received packets, signaling congestion status information from the first network element of the RAN toward a second network element of the RAN that is adapted for applying congestion control for the quality-of-service class.

In one embodiment, a method includes receiving, at a first network element of the RAN, from a second network element of the RAN, congestion status signaling indicative of a congestion condition associated with a quality-of-service class, and applying congestion control for the quality-of-service class in response to receiving the congestion status signaling indicative of the congestion condition.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables congestion control to be supported in a radio access network. The present invention uses congestion information in order to provide congestion control in a manner for reducing congestion in the radio access network. The congestion control may be in the form of flow control (e.g., controlling buffer sizes and transmission rates within the radio access network) and/or overload control (e.g., controlling one or more discard policies in order to shed load from the radio access network). The congestion control may be provided in both directions of transmission.

Figure 1:
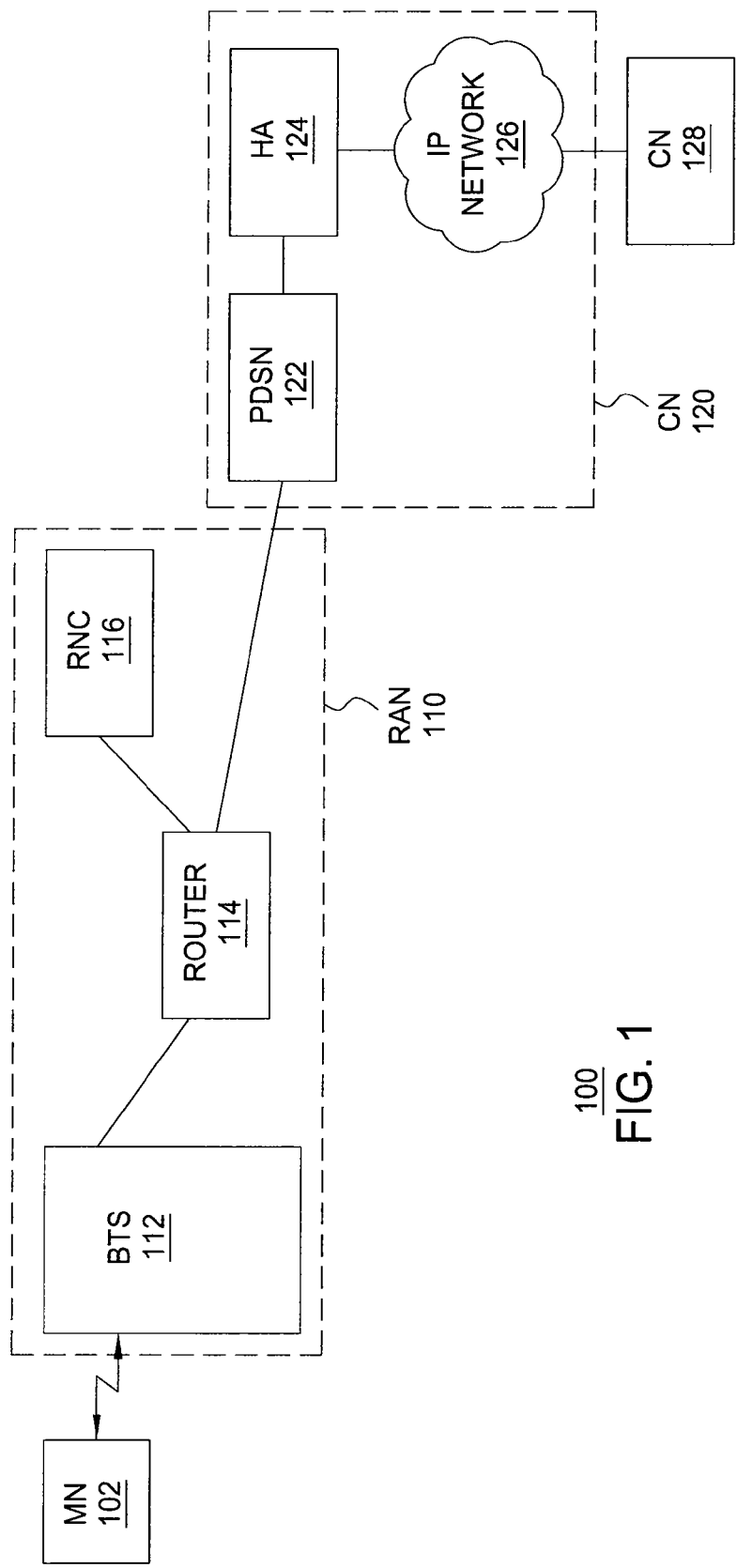
FIG. 1 depicts a high-level block diagram of a communication network including a radio access network (RAN) and a core network (CN)

FIG. 1 depicts a high-level block diagram of a communication network. Specifically, the communication network 100 includes a radio access network (RAN) 110 and a core network (CN) 120. The RAN 110 supports communications to and from mobile nodes associated with the RAN 110 (illustratively, mobile node (MN) 102). The CN 120 also supports communications to and from mobile nodes associated with the RAN 110, e.g., supporting communications between the mobile nodes and correspondent nodes with which the mobile nodes may communicate (illustratively, correspondent node (CN) 128).

As depicted in FIG. 1, RAN 110 includes a Base Transceiver Station (BTS) 112, a router 114, and a Radio Network Controller (RNC) 116, and CN 120 includes a Packet Data Serving Node (PDSN) 122, a Home Agent (HA) 124, and an IP network 126. The MN 102 and BTS 112 communicate wirelessly. The router 114 supports communications between BTS 112 and RNC 116. The HA 124 supports communications between PDSN 122 and IP network 126. The IP network 126 provides access to any other nodes available via the Internet. As depicted in FIG. 1, router 114 supports backhaul between RAN 110 and CN 120 via PDSN 122.

As described herein, BTS 112, router 114, and RNC 116 of RAN 110 cooperate to provide congestion control within RAN 110. The functions performed by BTS 112, router 114, and RNC 116 in support of congestion control may vary depending on the direction of packet flow. The operation of RAN 110 in controlling congestion within RAN 110 for traffic flowing to MN 102 associated with RAN 110 is depicted and described with respect to FIG. 2. The operation of RAN 110 in controlling congestion within RAN 110 for traffic flowing from MN 102 associated with RAN 110 is depicted and described with respect to FIG. 3.

Figure 2:
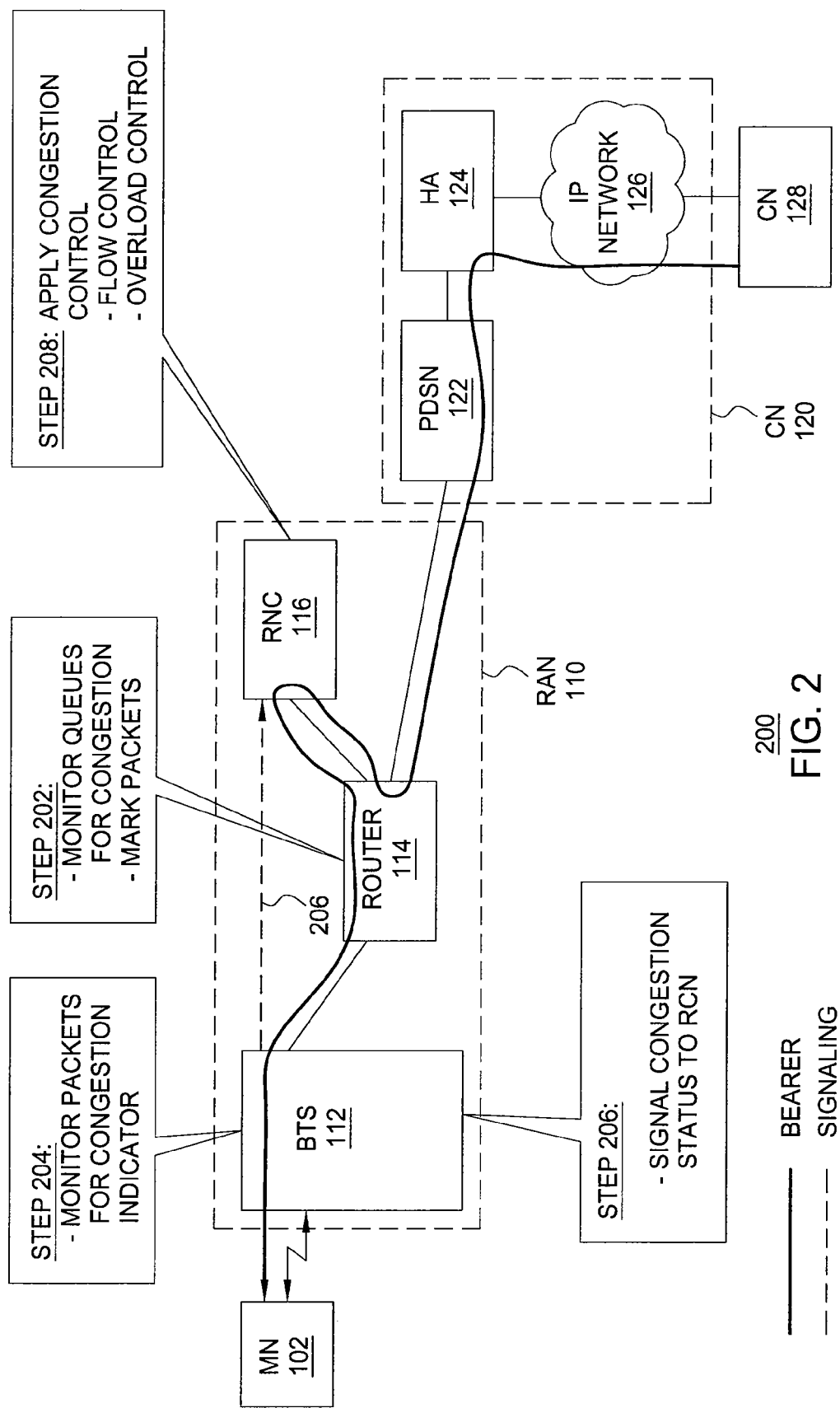
FIG. 2 depicts the communication network of FIG. 1 illustrating a method for controlling congestion in the RAN for data flowing toward mobile terminals associated with the RAN.

FIG. 2 depicts the communication network of FIG. 1 illustrating a method for controlling congestion in the RAN for data flowing toward mobile terminals associated with the RAN. As depicted in FIG. 2, data flows from CN 128 to MN 102 along the following path: CN 128, IP network 126, HA 124, PDSN 122, router 114, RNC 116, router 114, BTS 112, MN 102. As depicted in FIG. 2, packets flow from RNC 116 to BTS 112 via router 114.

As denoted by step 202, the router 114 includes one or more queues for controlling propagation of packets to BTS 112. The queues correspond to respective quality-of-service classes. The router 114 is configured such that queue thresholds are set at router 114 for the respective queues on router 114. In one embodiment, for each queue, a threshold is set for an average queue size of the queue. The router 114 then monitors the average queue sizes of the respective queues. In response to detecting that the average queue size of a queue exceeds the configured threshold, router 114 marks the packets of the queue with a congestion indicator. In one embodiment, the congestion indicator is marked using the Explicit Congestion Notification (ECN) bits in the Type of Service (TOS) field of an IP packet header. The congestion indicator may be marked in other ways. The marked packets then flow to BTS 112.

As denoted by step 204, BTS 112 receives packets from router 114. The BTS 112 is adapted to monitor the received packets for congestion indicators (e.g., to monitor the ECN bits of the received packets for an indication of congestion that is being experienced by router 114). In this manner, BTS 112 is able to determine a congestion status for each queue (and, thus, for each quality-of-service class) of router 114. The BTS 112 may monitor received packets for congestion indicators in any manner.

As denoted by step 206, in response to detecting a congestion condition based on monitoring of packets received from router 114, BTS 112 signals a congestion status to RNC 116, where the congestion status is indicative that a congestion condition has been detected. The BTS 112 may signal the congestion status to RNC 116 in any manner. In one embodiment, for example, BTS 112 signals the congestion status to RNC 116 using an existing signaling framework for signaling between BTS 112 and RNC 116. In one such embodiment, for example, BTS 112 may use proprietary signaling, one or more signaling fields available in standardized signaling messages, and/or other forms of signaling in order to signal the congestion status to RNC 116. The signaling may or may not traverse router 114 (depending on the configuration of backhaul between BTS 112 and RNC 116).

As denoted by step 208, RNC 116 receives the congestion status signaling from BTS 112. In response to receiving the congestion status signaling from BTS 112, RNC 116 applies congestion control. The RNC 116 applies congestion control to the quality-of-service class for which the congestion status signaling is received. The RNC 116 may apply congestion control in many ways.

In one embodiment, RNC 116 applies flow control. In this embodiment, RNC 116 adjusts one or more flow control buffers for the associated quality-of-service class for which the congestion status signaling is received, thereby throttling the data of that quality-of-service class that is destined for BTS 112 and, thus, relieving the congestion for that quality-of-service class at router 114.

In one embodiment, RNC 116 applies overload control. In this embodiment, RNC 116 drops packets in one or more packet flows of the associated quality-of-service class and/or drops one or more packet flows of the associated quality-of-service class. The dropping of packets and/or packet flows may be performed using one or more discard policies available to RNC 116.

In one embodiment, RNC 116 applies flow control before applying overload control (e.g., where there is sufficient flow control buffer space available to enable the RNC 116 to throttle the data of that quality-of-service class before having to drop data of that quality-of-service class). In this embodiment, RNC 116 may switch from applying flow control to applying overload control if there is insufficient flow control buffer space available for throttling the data of that quality-of-service class.

The RAN 110 may continue to apply congestion control until the congestion at router 114 is relieved.

The router 114 continues to monitor the average queue sizes of the respective queues. When the router 114 detects that the average queue size of the queue (i.e., the queue for which the average queue size exceeded the configured threshold) no longer exceeds the configured threshold, router 114 stops marking the packets of the queue with the congestion indicator. The router 114 may stop marking packets with the congestion indicator immediately or after some predetermined time (e.g., to make sure that the congestion has been cleared for some length of time before indicating that the congestion condition has cleared).

The BTS 112 continues to monitor the received packets for congestion indicators (e.g., to monitor the ECN bits of the received packets for an indication of congestion that is being experienced by router 114) to determine a congestion status for each queue. In this manner, since router 114 is no longer marking packets with the congestion indicator, BTS 112 determines that the congestion condition has cleared. In response to detecting that the congestion condition has cleared, BTS 112 signals a congestion status to RNC 116, where the signaled congestion status is indicative that a congestion condition has been cleared. The BTS 112 may signal the congestion status to RNC 116 in any manner (e.g., in a manner similar to signaling of congestion status indicative that a congestion condition is present, or in some other manner).

The RNC 116 receives the congestion status signaling from BTS 112. In response to receiving the congestion status signaling from BTS 112, RNC 116 suspends application of congestion control for the associated quality-of-service class for which the congestion status signaling is received. For example, where flow control is being used, RNC 116 adjusts the flow control buffer(s) to remove the previously applied throttling of data of that quality-of-service class. For example, where overload control is being used, RNC 116 suspends the one or more discard policies previously applied to that quality-of-service class.

Figure 3:
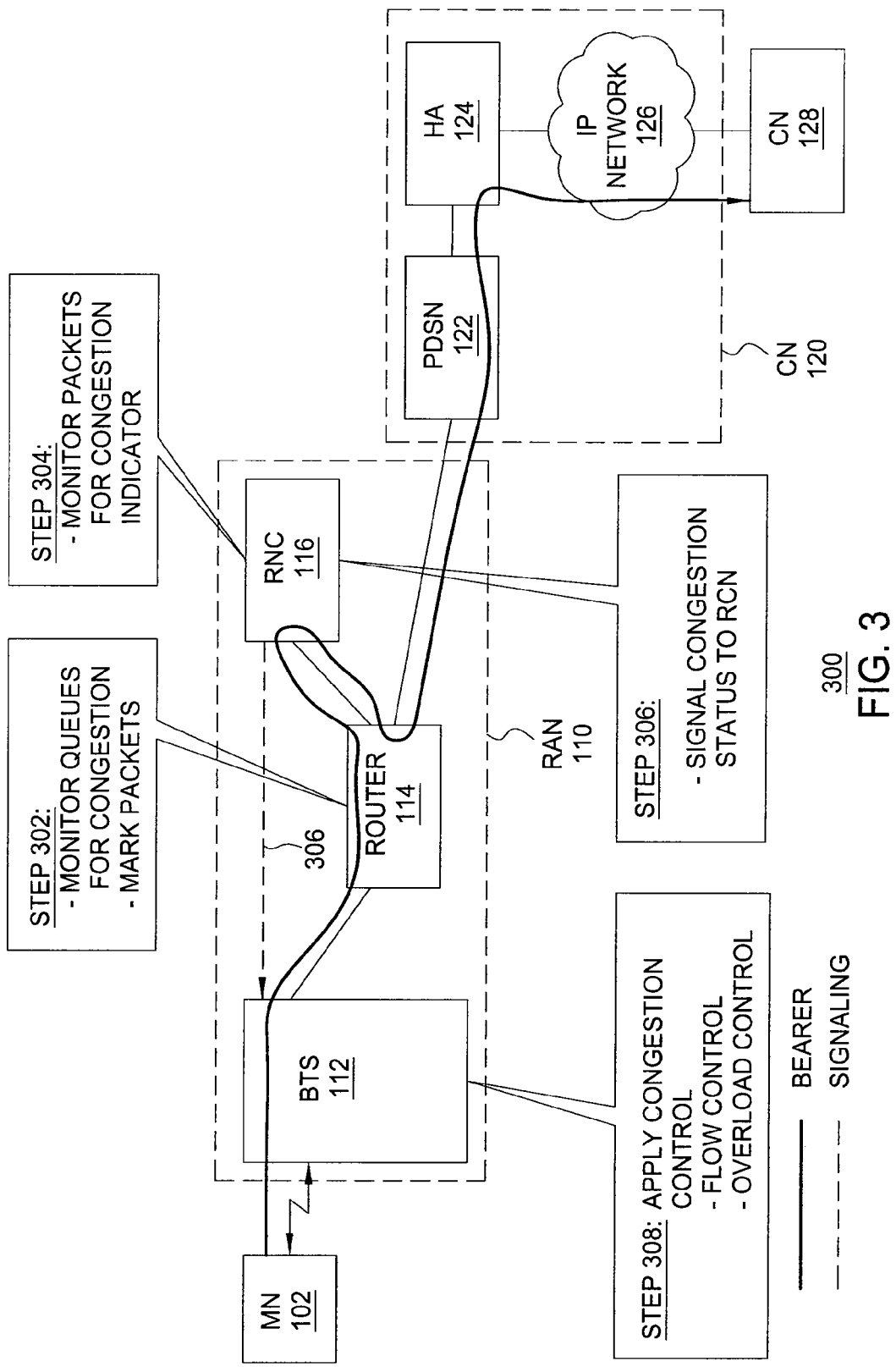
FIG. 3 depicts the communication network of FIG. 1 illustrating a method for controlling congestion in the RAN for data flowing from mobile terminals associated with the RAN.

FIG. 3 depicts the communication network of FIG. 1 illustrating a method for controlling congestion in the RAN for data flowing from mobile terminals associated with the RAN. As depicted in FIG. 3, data flows from MN 102 to CN 128 along the following path: MN 102, BTS 112, router 114, RNC 116, router 114, PDSN 122, HA 124, IP network 126, CN 128. As depicted in FIG. 3, packets flow from BTS 112 to RNC 116 via router 114.

The method for controlling congestion in the RAN for data flowing from mobile terminals associated with the RAN parallels the method for controlling congestion in the RAN for data flowing to mobile terminals associated with the RAN (i.e., congestion control functions described in FIG. 2 as being performed by RNC 116 are performed by BTS 112 and congestion control functions described in FIG. 2 as being performed by BTS 112 are performed by RNC 116).

As denoted by step 302, the router 114 includes one or more queues for controlling propagation of packets to RNC 116. The queues correspond to respective quality-of-service classes. The router 114 is configured such that queue thresholds are set at router 114 for the respective queues on router 114. In one embodiment, for each queue, a threshold is set for an average queue size of the queue. The router 114 then monitors the average queue sizes of the respective queues. In response to detecting that the average queue size of a queue exceeds the configured threshold, router 114 marks the packets of the queue with a congestion indicator. In one embodiment, the congestion indicator is marked using the Explicit Congestion Notification (ECN) bits in the Type of Service (TOS) field of an IP packet header. The congestion indicator may be marked in other ways. The marked packets then flow to BTS 112.

As denoted by step 304, RNC 116 receives packets from router 114. The RNC 116 is adapted to monitor the received packets for congestion indicators (e.g., to monitor the ECN bits of the received packets for an indication of congestion that is being experienced by router 114). In this manner, RNC 116 is able to determine a congestion status for each queue (and, thus, for each quality-of-service class) of router 114. The RNC 116 may monitor received packets for congestion indicators in any manner.

As denoted by step 306, in response to detecting a congestion condition based on monitoring of packets received from router 114, RNC 116 signals a congestion status to BTS 112, where the congestion status is indicative that a congestion condition has been detected. The RNC 116 may signal the congestion status to BTS 112 in any manner. In one embodiment, for example, RNC 116 signals the congestion status to BTS 112 using an existing signaling framework for signaling between RNC 116 and BTS 112. In one such embodiment, for example, RNC 116 may use proprietary signaling, one or more signaling fields available in standardized signaling messages, and/or other forms of signaling in order to signal the congestion status to BTS 112. The signaling may or may not traverse router 114 (depending on the configuration of backhaul between BTS 112 and RNC 116).

As denoted by step 308, BTS 112 receives the congestion status signaling from RNC 116. In response to receiving the congestion status signaling from RNC 116, BTS 112 applies congestion control. The BTS 112 applies congestion control to the quality-of-service class for which the congestion status signaling is received. The BTS 112 may apply congestion control in many ways. For example, BTS 112 may apply flow control and/or overload control as described hereinabove.

The RAN 110 may continue to apply congestion control until the congestion at router 114 is relieved.

The router 114 continues to monitor the average queue sizes of the respective queues. When the router 114 detects that the average queue size of the queue (i.e., the queue for which the average queue size exceeded the configured threshold) no longer exceeds the configured threshold, router 114 stops marking the packets of the queue with the congestion indicator. The router 114 may stop marking packets with the congestion indicator immediately or after some predetermined time (e.g., to make sure that the congestion has been cleared for some length of time before indicating that the congestion condition has cleared).

The RNC 116 continues to monitor the received packets for congestion indicators (e.g., to monitor the ECN bits of the received packets for an indication of congestion that is being experienced by router 114) to determine a congestion status for each queue. In this manner, since router 114 is no longer marking packets with the congestion indicator, RNC 116 determines that the congestion condition has cleared. In response to detecting that the congestion condition has cleared, RNC 116 signals a congestion status to BTS 112, where the signaled congestion status is indicative that the congestion condition has been cleared. The RNC 116 may signal the congestion status to BTS 112 in any manner (e.g., in a manner similar to signaling of congestion status indicative that a congestion condition is present, or in some other manner).

The BTS 112 receives the congestion status signaling from RNC 116. In response to receiving the congestion status signaling from RNC 116, BTS 112 suspends application of congestion control for the associated quality-of-service class for which the congestion status signaling is received. For example, where flow control is being used, BTS 112 adjusts the flow control buffer(s) to remove the previously applied throttling of data of that quality-of-service class. For example, where overload control is being used, BTS 112 suspends the one or more discard policies previously applied to that quality-of-service class.

Although primarily depicted and described herein with respect to a specific configuration of the RAN, the congestion control functions depicted and described herein may be supported for other configurations of the RAN.

For example, although primarily depicted and described herein with respect to embodiments in which one router (i.e., router 114) supports communications between BTS 112 and RNC 116 and supports communications between RAN 110 and CN 120, one or more additional routers may be employed in order to support communications between BTS 112 and RNC 116 and/or to support communications between RAN 110 and CN 120. Thus, although primarily depicted and described herein with respect to embodiments in which bearer traffic and congestion status signaling between BTS 112 and RNC 116 always traverse the same router, bearer traffic and congestion status signaling between BTS 112 and RNC 116 may be routed within RAN using any number and/or configuration of routing elements.

For example, bearer traffic propagated from RNC 116 to BTS 112 for delivery from CN 128 to MN 102 may traverse one router while congestion status signaling propagated from BTS 112 to RNC 116 may traverse another router. Similarly, for example, bearer traffic propagated from BTS 116 to RNC 116 for delivery to CN 128 may traverse one router while congestion status signaling propagated from BTS 112 to RNC 116 may traverse two other routers. In other words, queues on any number of routers may be monitored for congestion and, thus, BTS 112 (for traffic flowing to MN 102) and RNC 116 (for traffic flowing from MN 102) may monitor packets from any number of routers for indications of congestion.

Although primarily depicted and described herein with respect to controlling congestion in an EVDO-based RAN, the congestion control functions depicted and described herein may be utilized for controlling congestion in other types of RANs. For example, the congestion control functions depicted and described herein may be utilized for controlling congestion in other types of Code Division Multiple Access (CDMA) RANs, in Universal Mobile for Telecommunications (UMTS) RANs, in Worldwide Interoperability for Microwave Access (WiMAX) RANs, and the like.

In a UMTS-based RAN, the functions described herein as being performed by BTS 112 may be performed by a Node B and the functions described herein as being performed by RNC 116 may be performed by a Radio Network Controller. Similarly, in a WiMAX network, the functions described herein as being performed by BTS 112 may be performed by a base station and the functions described herein as being performed by RNC 116 may be performed by an Access Service Network-Gateway (ASN-GW). Thus, BTS 112 and RNC 116 may be referred to more generically as a radio access node and a controller, respectively.

Although primarily depicted and described herein with respect to IP packets, the congestion control functions depicted and described herein may be utilized for controlling congestion in RANs that convey information using other types of packets. In such embodiments, congestion may be marked in the packets in any manner supported by the type of packet for which congestion must be marked.

Although primarily depicted and described herein with respect to queues (e.g., queues of the router) and buffers (e.g., buffers of controllers and radio access nodes) organized based on quality-of-service classes, queues and buffers may be organized based on one or more other factors (e.g., individual users, user groups, applications, application groups, and the like, as well as various combinations thereof). Although primarily depicted and described wherein with respect to multiple queues and buffers, in some embodiments only one queue and/or one buffer may be used for data exchanged between the controller and the radio access node).

Figure 4:
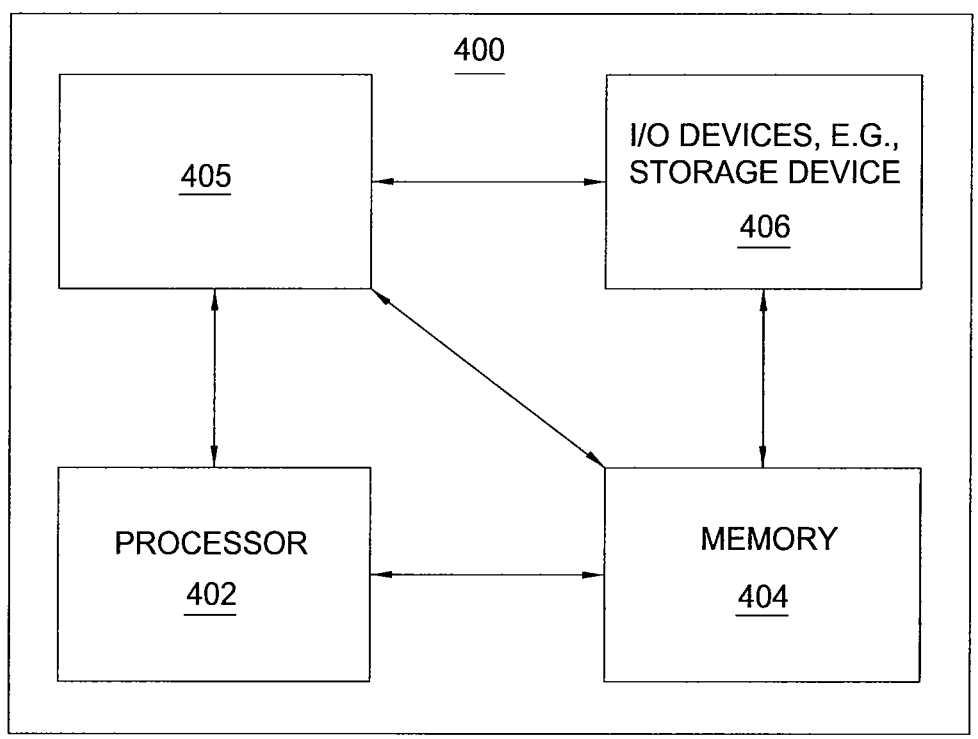
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a congestion control module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the congestion control process 405 can be loaded into memory 404 and executed by processor 402 to implement the functions as discussed above. As such, congestion control process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for controlling congestion in a radio access network (RAN), comprising:
   detecting an indication of congestion within a packet received at a controller of the RAN, wherein the packet, when received at the controller of the RAN, includes the indication of congestion, wherein the packet is associated with a quality-of-service class; and
   in response to detecting the indication of congestion in the received packet, signaling congestion status information from the controller of the RAN toward a radio access node of the RAN that is adapted for applying congestion control for the quality-of-service class.

2. The method of claim 1, wherein the indication of congestion is detected based on at least one Explicit Congestion Notification (ECN) bit in a header of the packet.

3. The method of claim 1, wherein the indication of congestion detected in the received packet at the controller of the RAN is set by a router adapted for monitoring for congestion.

4. The method of claim 3, wherein the indication of congestion is set by the router in response to detecting that an average queue size of a queue associated with the quality-of-service class satisfies a threshold.

5. The method of claim 3, wherein the router is disposed between the controller of the RAN and the radio access node of the RAN.

6. The method of claim 1, wherein the congestion status signaling is signaled from the controller of the RAN toward the radio access node of the RAN using an existing signaling framework of the RAN.

7. The method of claim 1, further comprising:
   receiving the congestion status signaling at the radio access node of the RAN; and
   applying congestion control for the quality-of-service class in a manner adapted for reducing congestion in the RAN.

8. The method of claim 7, wherein applying congestion control comprises at least one of applying flow control and applying overload control.

9. The method of claim 8, wherein applying flow control comprises adjusting at least one flow control buffer, wherein applying overload control comprises at least one of dropping at least one packet and dropping at least one packet flow.

10. The method of claim 8, wherein flow control is applied as long as there is sufficient buffer space at the radio access node of the RAN, and, if there is no longer sufficient buffer space at the radio access node of the RAN, overload control is applied.

11. The method of claim 7, further comprising:
    identifying, at the controller of the RAN, that the indication of congestion has cleared, wherein the controller of the RAN identifies that the indication of congestion has cleared by monitoring received packets; and
    in response to identifying that the indication of congestion has cleared, propagating congestion status signaling from the controller of the RAN toward the radio access node of the RAN, wherein the congestion status signaling is adapted for causing the radio access node of the RAN to suspend application of congestion control for the quality-of-service class.

12. The method of claim 1, wherein:
    when the RAN is a CDMA-based RAN, the controller comprises a Radio Network Controller (RNC) and the radio access node comprises a Base Station (BS); or
    when the RAN is a UMTS-based RAN, the controller comprises a Radio Network Controller (RNC) and the radio access node comprises a Node-B; or
    when the RAN is a WiMAX-based RAN, the controller comprises an Access Service Network-Gateway (ASN-GW) and the radio access node comprises a Base Station (BS).

13. An apparatus for controlling congestion in a radio access network (RAN), comprising:
    a processor configured for:
    detecting an indication of congestion within a packet received at a controller of the RAN, wherein the packet, when received at the controller of the RAN, includes the indication of congestion, wherein the packet is associated with a quality-of-service class; and
    in response to detecting the indication of congestion in the received packet, congestion status information from the controller of the RAN toward a radio access node of the RAN that is adapted for applying congestion control for the quality-of-service class.

14. A method for controlling congestion in a radio access network (RAN), comprising:
    receiving, at a radio access node of the RAN, a packet associated with a quality-of-service class;
    propagating the packet from the radio access node toward a controller of the RAN via a path comprising a router;
    receiving congestion status signaling indicative of a congestion condition associated with the quality-of-service class, wherein the congestion status signaling is received at the radio access node from the controller, the congestion status signaling being received responsive to detection by the controller of an indication of congestion included within the packet when the packet is received at the controller, the indication of congestion being marked in the packet by the router in response to detecting congestion associated with the quality-of-service class at the router; and applying congestion control for the quality-of-service class at the radio access node in response to receiving the congestion status signaling indicative of the congestion condition.

15. The method of claim 14, wherein the indication of congestion included within the packet comprises an Explicit Congestion Notification (ECN) bit set in a header of the packet.

16. The method of claim 14, wherein the indication of congestion is marked by the router in the packet in response to detecting that an average queue size of a queue associated with the quality-of-service class satisfies a threshold.

17. The method of claim 14, wherein the congestion status signaling received at the radio access node of the RAN is received from the controller of the RAN via an existing signaling framework of the RAN.

18. The method of claim 14, wherein applying congestion control comprises at least one of applying flow control and applying overload control.

19. The method of claim 18, wherein applying flow control comprises adjusting at least one flow control buffer, wherein applying overload control comprises at least one of dropping at least one packet and dropping at least one packet flow.

20. The method of claim 18, wherein flow control is applied as long as there is sufficient buffer space at the radio access node of the RAN, and, if there is no longer sufficient buffer space at the radio access node of the RAN, overload control is applied.

21. The method of claim 14, further comprising:
receiving, at the radio access node of the RAN, from the controller of the RAN, congestion status signaling indicative that the congestion condition associated with the quality-of-service class has cleared; and suspending application of congestion control for the quality-of-service class in response to receiving the congestion status signaling indicative that the congestion condition has cleared.

22. The method of claim 14, wherein:
when the RAN is a CDMA-based RAN, the controller comprises a Radio Network Controller (RNC) and the radio access node comprises a Base Station (BS); or
when the RAN is a UMTS-based RAN, the controller comprises a Radio Network Controller (RNC) and the radio access node comprises a Node-B; or
when the RAN is a WiMAX-based RAN, the controller comprises an Access Service Network-Gateway (ASN-GW) and the radio access node comprises a Base Station (BS).

23. An apparatus for controlling congestion in a radio access network (RAN), comprising:
a processor configured to:
receive, at a radio access node of the RAN, a packet associated with a Quality-of-service class;
propagate the packet from the radio access node toward a controller of the RAN via a path comprising a router;
receive congestion status signaling indicative of a congestion condition associated with the quality-of-service class, wherein the congestion status signaling is received at the radio access node from the controller, the congestion status signaling being received responsive to detection by the controller of an indication of congestion included within the packet when the packet is received at the controller, the indication of congestion being marked in the packet by the router in response to detecting congestion associated with the quality-of-service class at the router; and
apply congestion control for the quality-of-service class at the radio access node in response to receiving the congestion status signaling indicative of the congestion condition.

* * * * *